United States Patent
Schwartz

(10) Patent No.: US 10,032,292 B2
(45) Date of Patent: *Jul. 24, 2018

(54) INTERPRETING TEXTURE IN SUPPORT OF MOBILE COMMERCE AND MOBILITY

(71) Applicant: International Business Machines Corporation, Armonk, NY (US)

(72) Inventor: Robyn R. Schwartz, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/144,174

(22) Filed: May 2, 2016

(65) Prior Publication Data
US 2016/0247298 A1     Aug. 25, 2016

Related U.S. Application Data

(63) Continuation of application No. 13/889,664, filed on May 8, 2013, now Pat. No. 9,361,709.

(51) Int. Cl.
| G06T 11/00 | (2006.01) |
| G06Q 30/00 | (2012.01) |
| G06Q 30/06 | (2012.01) |

(52) U.S. Cl.
CPC ........ *G06T 11/001* (2013.01); *G06Q 30/0643* (2013.01); *G06T 2210/16* (2013.01)

(58) Field of Classification Search
CPC .......................... G06T 11/001; G06Q 30/0643
USPC .......................................................... 345/583
See application file for complete search history.

(56) References Cited

U.S. PATENT DOCUMENTS

| 4,763,136 A | 4/1988 | Isobe et al. |
| 4,859,080 A * | 8/1989 | Titus ................. G01J 5/522 219/543 |
| 7,566,273 B2 | 7/2009 | Kitsutaka |
| 8,010,311 B1 * | 8/2011 | Warnke ............... G01J 5/02 116/207 |
| 2005/0017947 A1 * | 1/2005 | Shahoian ........... G06F 1/1616 345/156 |
| 2010/0030660 A1 | 2/2010 | Edwards |
| 2010/0231367 A1 * | 9/2010 | Cruz-Hernandez ... G06F 3/0488 340/407.2 |
| 2010/0231508 A1 * | 9/2010 | Cruz-Hernandez ... G06F 3/0488 345/156 |
| 2010/0238114 A1 | 9/2010 | Vartanian |
| 2011/0012496 A1 | 1/2011 | Chang et al. |

(Continued)

OTHER PUBLICATIONS

Cole, et al, U.S. Appl. No. 13/458,498, "Providing a Sense of Touch in a Mobile Device Using Vibration", filed Apr. 27, 2012.

(Continued)

*Primary Examiner* — Devona Faulk
*Assistant Examiner* — Hai Tao Sun
(74) *Attorney, Agent, or Firm* — John Pivnichny

(57) ABSTRACT

A portable pervasive device includes a combined visual and thermal display. The user is able to detect texture of displayed objects visually and through touching the combined display. A software application pre-defines color codes and temperature settings for a plurality of textures on a graded scale including smooth, soft, and rough. The object is then shown on the display using the color codes and temperature settings for at lest one surface of the object.

17 Claims, 3 Drawing Sheets

(56) References Cited

U.S. PATENT DOCUMENTS

2011/0298800 A1* 12/2011 Schlichte ................ G06T 15/04
                                                   345/420
2011/0298897 A1* 12/2011 Sareen ................... G06N 3/006
                                                   348/47

OTHER PUBLICATIONS

Colgate, J. Edward, et al, "On the Design of a Thermal Display for Upper Extremity Prosthetics", Symposium on Haptic Interfaces for Virtual Environments and Teleoperator Systems, Mar. 13-14, 2008, Reno, Nevada, USA, pp. 413-419.
"Texture Mapping", Wikipedia, retrieved Jul. 30, 2012, 5 pages.

* cited by examiner

INTERPRETING TEXTURE IN SUPPORT OF MOBILE COMMERCE AND MOBILITY

CROSS REFERENCE TO RELATED APPLICATION

This application is a continuation application claiming priority to Ser. No. 13/889,664 filed May 8, 2013.

BACKGROUND OF THE INVENTION

Field of the Invention

The invention relates to electronic retail sale of objects having a texture surface. More specifically, the invention relates to effectively communicating the texture to a potential customer in a mobile device via a visual and thermal display.

Description of the Related Art

With the increasing adoption of mobile communication devices, such as mobile phones and, in particular, smartphones, mobile commerce is increasing at a rapid pace from year to year. Using mobile phone applications, mobile web sites, or a combination of thereof, users of mobile communication devices are able to utilize online stores and shopping sites to search for, compare, and purchase objects, such as products or items provided by enterprises for purchase, using their mobile communication devices. Using a mobile communication device to purchase objects has some advantages, such as the user may make these purchasing decisions at his or her convenience, at any time, and at any place.

One aspect of objects of interest to potential customers is the surface texture of the object. This is particularly important for marketing of articles of clothing where the customer wants to know the feel of the article.

Currently, systems may use various colors to denote surface texture, such as employed in the system of US Patent Application US20110298897. Patterns of cross-hatching may also be used to denote texture. Shading may also be used, such as that employed in US Patent Application US20100030660. Vibration may also be used to provide haptic feedback in a mobile communication device using a variable frequency vibration device, such as employed in U.S. patent application Ser. No. 13/458,498, filed Apr. 27, 2012.

BRIEF SUMMARY OF THE INVENTION

According to one embodiment of the present invention, an image of an object having a surface texture is provided. Color codes for a plurality of surface textures are pre-defined. Temperature settings for the plurality of surface textures are also pre-defined. A combined visual and thermal display device is then used to display the object using the pre-defined color codes and pre-defined temperature settings to indicate the texture of the object. A user, by observing and touching the combined display device can thereby get a better idea of the texture of the object than would otherwise be possible with a visual display alone.

In another embodiment of the invention, a portable pervasive device, such as a smartphone or tablet computer includes a combined visual and thermal display device. A software application running on the processor acquires a coded image of an object having texture, such as an article of clothing. The processor may acquire the coded image by selecting a UPC (uniform product code) of an object on an electronic website and interrogating an on-line database for the coded image. Texture information is included in the coded image. The software application accepts pre-defined color codes for a plurality surface texture and pre-defined temperature setting for the plurality of surface texture. A display software application, also running on the processor drives the combined visual and thermal display to depict an image of the object using the pre-defined color codes and pre-defined temperature settings. A user of the portable pervasive device may then view and touch the combined display to judge the texture of the object.

DETAILED DESCRIPTION

For a better understanding of the present invention, together with other and further objects, advantages, and capabilities thereof, reference is made to the following disclosure and the appended claims in connection with the above-described drawings.

Figure 1:
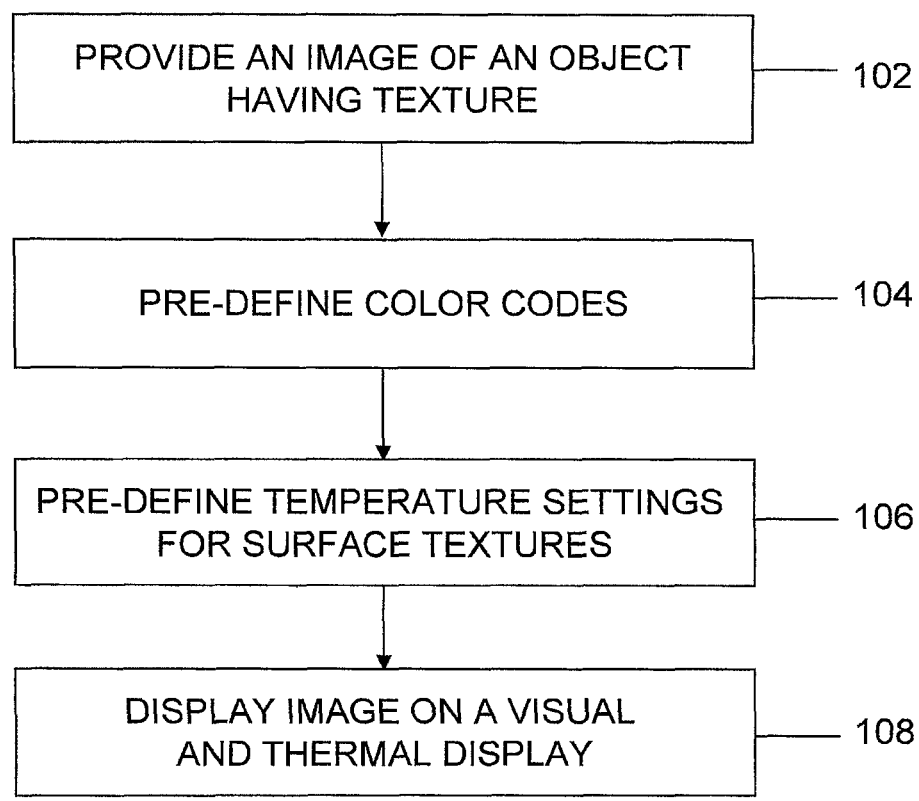
FIG. 1 is a flowchart of steps performed in practicing one embodiment of the invention.

In FIG. 1, there is shown a flowchart of steps performed to practice an embodiment of the present invention. In step 102, an encoded image of an object having texture is provided. The object has at least one surface of interest because of its texture. For example, the object may be an article of clothing such as a ladies jacket. The surface of interest may be the outer surface of an arm sleeve, or the top surface of a lapel. The texture may be assessed on a graded texture scale. The scale may include smooth, soft, and rough as distinct points of a numeric scale. The encoded image includes such texture information for one or more surfaces of the object along with the normal visual encoding of the image.

In step 104 color codes are pre-defined for a plurality of surface textures. For example, texture mapping may be used to indicate texture of a surface. Other methods of using color codes, color shift, cross-hatching, or shading may be used to visually indicate texture. The term "color codes" as used herein shall be taken to mean any of the above mentioned methods of visually indicating texture.

In step 106, temperature settings are pre-defined to indicate surface textures. As described below, a combination visual and thermal display is used with the present invention. A user may touch, as well as, view the display to determine texture of a surface of a displayed object.

Temperature settings may, for example, be pre-defined to align with the graded texture scale above with a higher temperature assigned to a smooth, warm texture, and a lower temperature to a coarse, rough texture. Other texture scales and pre-definitions of temperature settings may also be used.

For example, the coding may include an empirical prescriptive of the defined temperature for a given product surface, but it may vary in presentation based on known or understood preferences. It may also vary with the intent to guide preferred sentimental responses to a particular product or experience.

In step 108, the encoded image is displayed on the combination visual and thermal display device. The term "thermal display" is used herein as a two-dimensional array of thermal elements, each element independently controllable to a particular temperature setting. Such displays are described by Titus in U.S. Pat. No. 4,859,080 and Isobe in U.S. Pat. No. 4,763,136.

The individual elements each constitute a "thermal pixel" in the overall thermal display. The pixel elements may be a heater element using a thin film resister. An array of peltier elements may also be used in which case each "thermal pixel" can provide heating to raise its surface temperature or cooling to reduce its surface temperature. Other thermal pixel elements known in the art or equivalent may also be used.

The total number of individual thermal elements defines the overall resolution of the thermal display. For example, 64 rows of 64 elements each as described by Titus may be used.

The term "thermal display" as used herein is not to be confused with a completely different visual display device, also called a thermal display, in which a visual image is made, usually using special thermally sensitive paper, and a thermal stylus.

The thermal display of the present invention is combined by alignment with a visual display, such as a flat screen LCD display. The combination is arranged so that a viewer can simultaneously view a visual image and also touch the viewing screen with one or more fingers to detect the temperature at a location of the display. In one such arrangement, the thermal display is positioned directly beneath the visual display. Contact between the two transfers heat from the thermal pixels through the visual display to its surface so a user may sense the temperature by touching a region of the visual display. For example, if the object displayed is a ladies jacket, the viewer may touch the lapel area of the screen to feel if it is warm and compare it to other parts of the image or images of other objects. The viewer may also simultaneously detect texture visually from the color code applied to the display of the lapel as described above.

In general, the resolution of the thermal display as measured in thermal pixels will be much less than the visual display resolution. This difference in resolution is accommodated in the alignment of several visual pixels for each thermal pixel. This is acceptable because the sensory resolution of a human finger is much less than the visual resolution of the human eyes.

The viewer, after sensing texture, may then decide to purchase the article of clothing, having more knowledge of the texture of the lapel or any other part of the garment. She may also use the present invention to compare articles of clothing from various sources; do comparison shopping; or engage in any other on-line activity.

Figure 2:
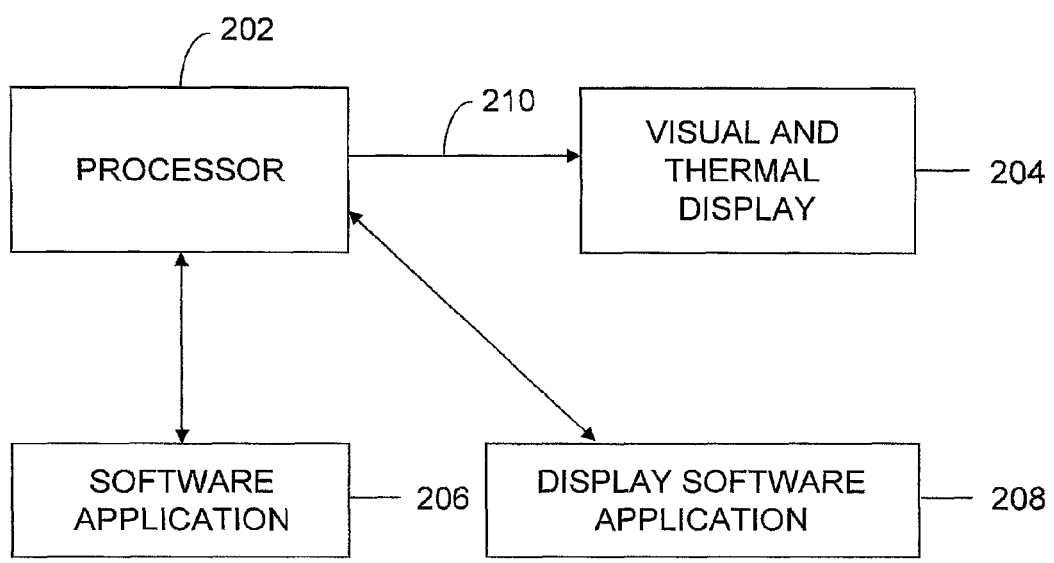
FIG. 2 is a system diagram depicting elements for an embodiment of the invention.

In FIG. 2, there is shown a system for practicing an embodiment of the present invention. Processor 202 is a programmable processor as described below in connection with FIG. 3, but is preferably a portable device, such as a smartphone or tablet computer. It is also preferably a pervasive device, meaning it is usually carried about by the owner throughout the day.

The portable device having processor 202 also has portable combined visual and thermal display 204 integrally mounted and digitally connected 210. Display 204 is constructed and operates as described above.

Software application 206 runs on a processor 202. It is capable of providing a coded image of an object having at least one surface texture. The texture information is coded along with a visual image as described above.

Application 206 is also capable of accepting pre-defined color codes for a plurality of surface textures, and accepting pre-defined temperature settings for the plurality of surface textures.

Display software application 208 also runs on processor 202. Application 208 drives the combined visual and thermal display, via processor 202, to display the image of the object using the pre-defined color code and the pre-defined temperature settings to indicate the texture of at least one surface of the object.

Figure 3:
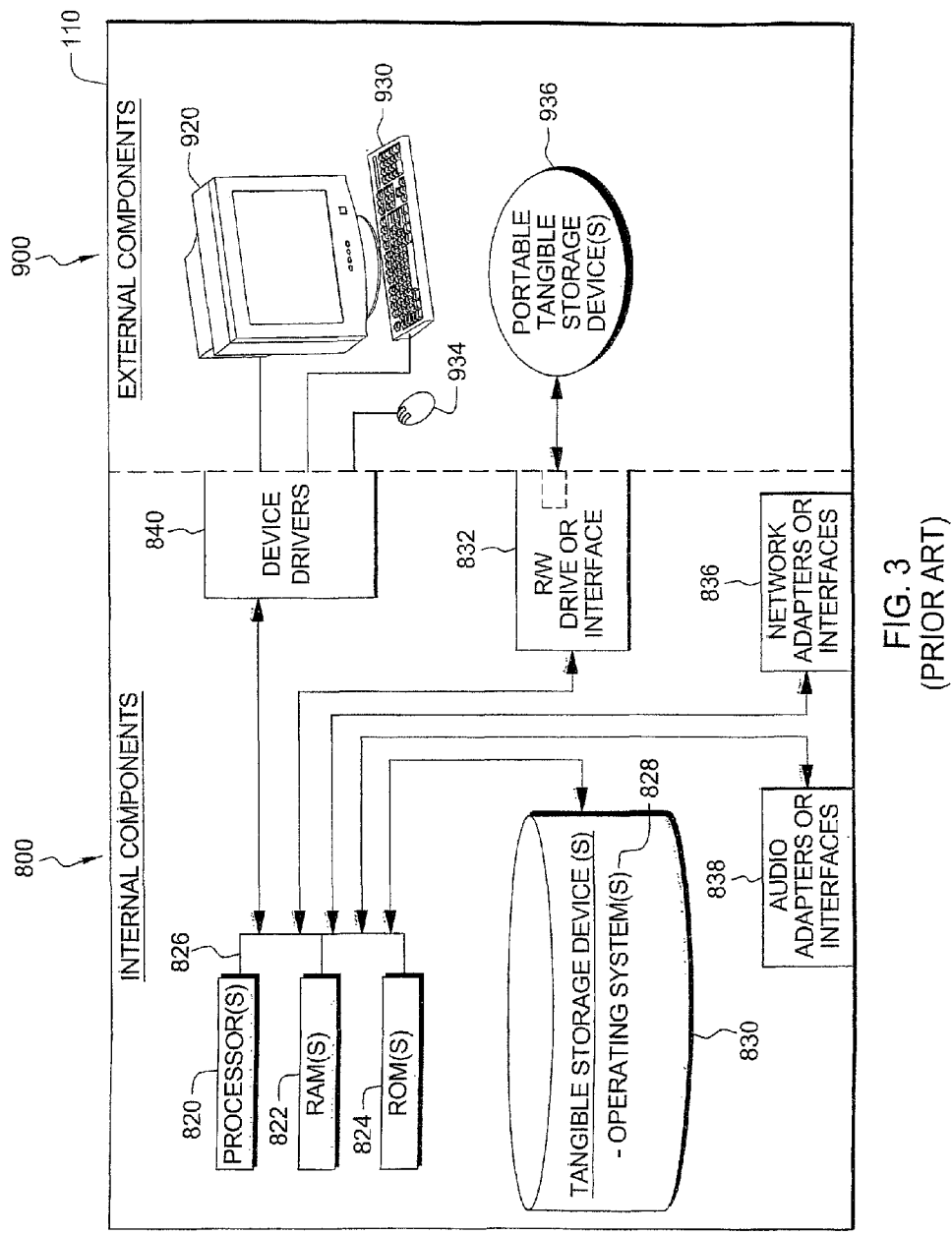
FIG. 3 is a system diagram of a processor as used for an element of the system of FIG. 2.

FIG. 3. shows a block diagram of internal components 800 and external components 900 of a computer 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Computer 110 is representative of any electronic device capable of executing machine-readable program instructions. Computer 110 may be representative of a computer system or other electronic devices. Examples of computing systems, environments, and/or configurations that may be represented by computer 110 include, but are not limited to, personal computer systems, server computer systems, thin clients, thick clients, laptop devices, smartphones, multiprocessor systems, microprocessor-based systems, network PCs, minicomputer systems, and distributed cloud computing environments that include any of the above systems or devices.

Computer 110 includes a set of internal components 800 and external components 900. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, functions in computer device 110 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. Functions in computer 110 can be stored on one or more of the respective portable computer-readable tangible storage devices 936, read via the respective R/W drive or interface 832 and loaded into the respective hard drive 830.

Internal components 800 also includes audio adapters or interfaces 838 such as a sound card, hardware mixer, amplifier, or other adapters or interfaces for receiving audio signals from microphones.

Internal components 800 also includes network adapters or interfaces 836 such as a TCP/IP adapter cards, wireless wi-fi interface cards, or 3G or 4G wireless interface cards or other wired or wireless communication links. Functions in computer 110 can be downloaded to computer 110 from an external computer via a network (for example, the Internet, Cloud 24, a local area network or other, wide area network)

and respective network adapters or interfaces 836. From the network adapters or interfaces 836. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Portable infrared reader 12 has a sufficient combination of infrared emitting components 404 and sensing devices 403 to read the identifier by selectively emitting infrared energy and sensing the infrared energy reflected or absorbed by bands 412, 414, and 416 of infrared dyes on thread 410, when the infrared energy 407 from reader 12 is aimed in the direction of apparel item 16. In some embodiments, more than one identical thread 410 may be woven into the fabric to increase the overall reflectance or absorbance, thereby increasing the overall system sensitivity, and increasing the operating distance over which the system may be used.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A method of displaying texture, comprising the steps of:
   providing an image of an object having a texture;
   pre-defining color codes for a plurality of surface textures;
   pre-defining temperature settings for said plurality of surface textures; and
   displaying on a visual and thermal display, wherein said visual display comprises a flat screen LCD display and said thermal display is positioned directly beneath and in contact with said visual display, said image of said object using the pre-defined color codes and the pre-defined temperature settings to indicate said texture of said object wherein said thermal display is a two dimensional array of thermal elements, each element independently controllable to a particular temperature setting and said thermal elements each constitute a thermal pixel in the thermal display and the thermal pixel is a heater element using a thin film resister or a peltier element to provide heating to raise its surface temperature or cooling to reduce its surface temperature and said thermal display is positioned directly beneath said visual display so that contact between the two transfers heat from said thermal pixels through said visual display to its surface permitting a user by touching said visual display to determine texture on a graded texture scale, of a surface of a displayed object from sensing by said touching said surface temperature of said visual display, and pre-defined temperature settings to indicate surface textures.

2. The method of claim 1, wherein said object is an article of clothing.

3. The method of claim 1, wherein said visual and thermal display is part of a portable computing device.

4. The method of claim 3, wherein said portable computing device is a smart mobile phone.

5. The method of claim 3, wherein said portable computing device is a tablet computer.

6. The method of claim 1, wherein a given surface of said object is assessed in terms of texture based on a graded scale of textures, for said pre-defining of said color codes or said temperature settings.

7. The method of claim 6, wherein said graded scale includes smooth, soft, and rough.

8. The method of claim 3, wherein said portable computing device is a pervasive device.

9. A system for displaying texture, comprising:
   a processor;
   a visual and thermal display, wherein said visual display comprises a flat screen LCD display and said thermal display is positioned directly beneath and in contact with said visual display, connected to said processor wherein said thermal display is a two dimensional array of thermal elements, each element independently controllable to a particular temperature setting and said thermal elements each constitute a thermal pixel in the thermal display and the thermal pixel is a heater element using a thin film resister or a peltier element to provide heating to raise its surface temperature or cooling to reduce its surface temperature and said thermal display is positioned directly beneath said visual display so that contact between the two transfers heat from said thermal pixels through said visual display to its surface permitting a user by touching said visual display to determine texture on a graded texture scale, of a surface of a displayed object from sensing by said touching said surface temperature of said visual display, and pre-defined temperature settings to indicate surface textures;

a software application running on said processor, said software application capable of providing an image of an object having a texture, and accepting pre-defined color codes for a plurality of surface textures, and accepting pre-defined temperature settings for said plurality of surface textures; and a display software application running on said processor for driving said visual and thermal display to display said image of said object using the pre-defined color codes and the pre-defined temperature settings to indicate said texture of said object.

10. The system of claim 9, wherein said object is an article of clothing.

11. The system of claim 9, wherein said visual and thermal display is part of a portable computing device.

12. The system of claim 11, wherein said portable computing device is a smart mobile phone.

13. The system of claim 11, wherein said portable computing device is a tablet computer.

14. The system of claim 9, wherein a given surface of said object is assessed in terms of texture based on a graded scale of textures, for said pre-defining of said color codes or said temperature settings.

15. The system of claim 14, wherein said graded scale includes smooth, soft, and rough.

16. The system of claim 11, wherein said portable computing device is a pervasive device.

17. A computer readable storage device on which is stored a set of computer instructions, wherein the set of computer instructions, when executed by a processor: provides a system for displaying texture when said processor is connected to a visual and thermal display, wherein said visual display comprises a flat screen LCD display and said thermal display, is positioned directly beneath and in contact with said visual display, wherein said set of computer instructions comprise:

instructions for providing an encoded image of an object having a texture;

instructions for pre-defining color codes for a plurality of surface textures;

instructions for pre-defining temperature settings for said plurality of surface textures; and instructions for displaying on said visual and thermal display, said encoded image of said object using the pre-defined color codes and the pre-defined temperature settings to indicate said texture of said object and wherein said thermal display is a two dimensional array of thermal elements, each element independently controllable to a particular temperature setting and said thermal elements each constitute a thermal pixel in the thermal display and the thermal pixel is a heater element using a thin film resister or a peltier element to provide heating to raise its surface temperature or cooling to reduce its surface temperature and said thermal display is positioned directly beneath said visual display so that contact between the two transfers heat from said thermal pixels through said visual display to its surface permitting a user by touching said visual display to determine texture on a graded texture scale, of a surface of a displayed object from sensing by said touching said surface temperature of said visual display, and pre-defined temperature settings to indicate surface textures.

* * * * *